Feb. 28, 1939.  W. H. PAYNE  2,148,834
CLAMPING MECHANISM FOR ELECTRIC ARC FURNACE ELECTRODES
Filed March 13, 1937  2 Sheets-Sheet 1
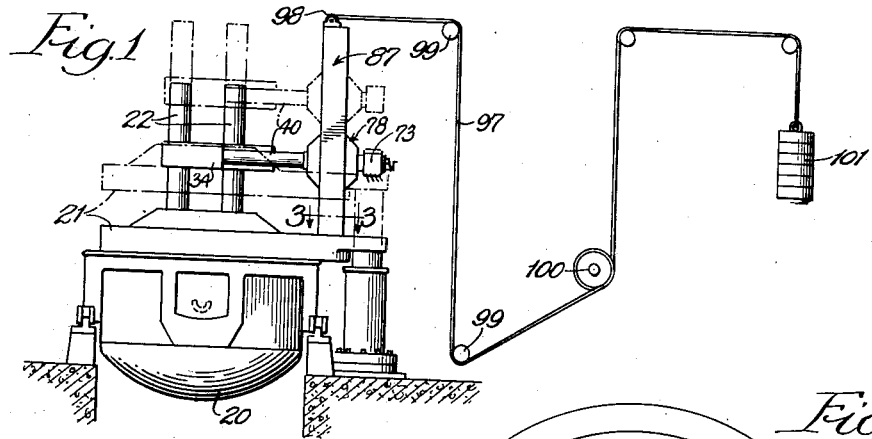
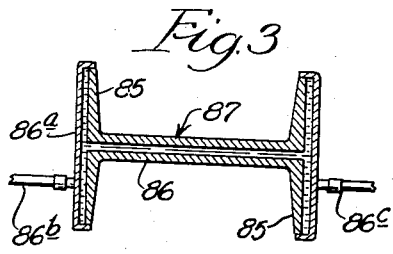
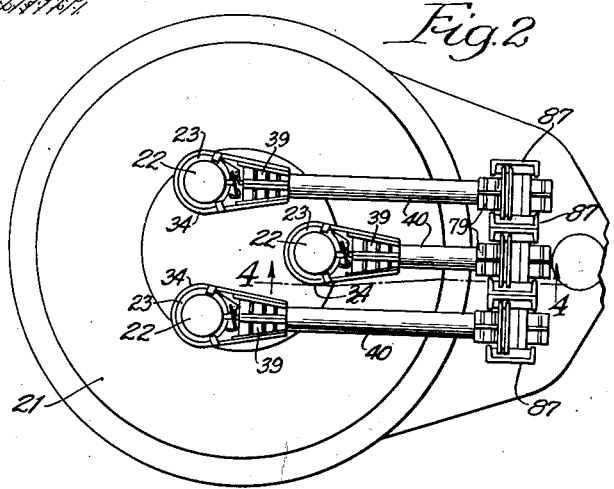
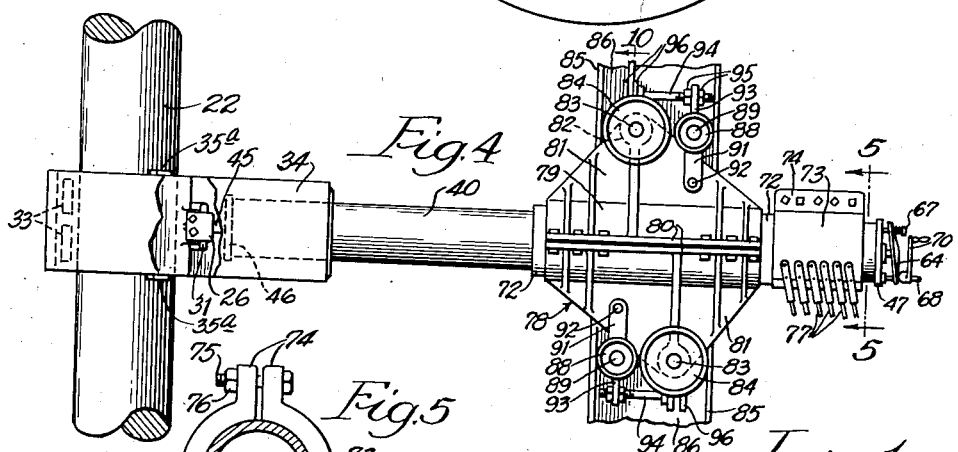
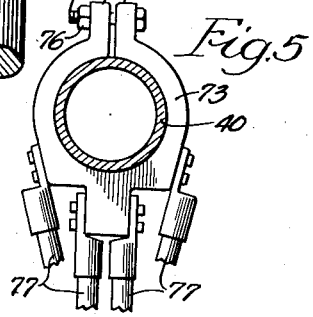
Inventor:
William Harvey Payne,
By Dunning & Dunning
Attorneys.

Feb. 28, 1939.  W. H. PAYNE  2,148,834
CLAMPING MECHANISM FOR ELECTRIC ARC FURNACE ELECTRODES
Filed March 13, 1937  2 Sheets-Sheet 2
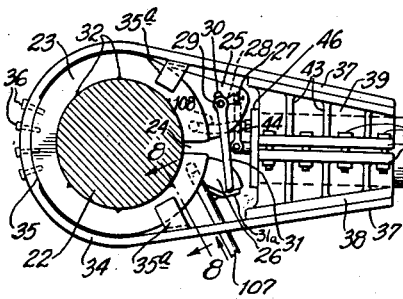
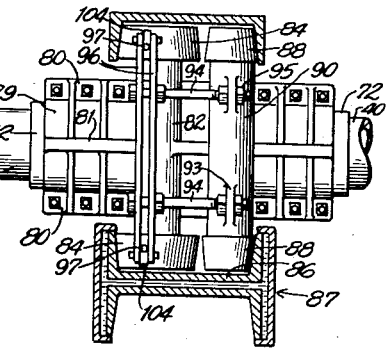
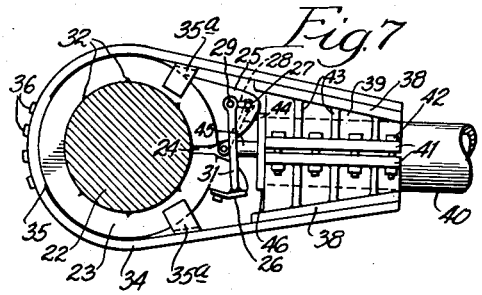
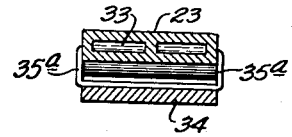
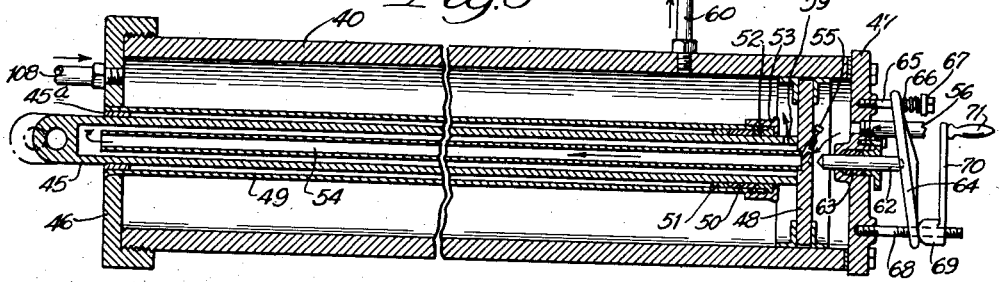
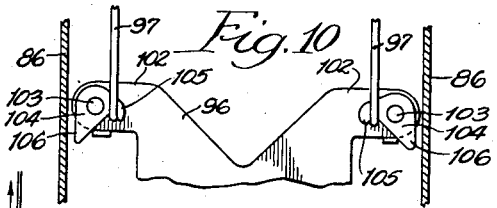
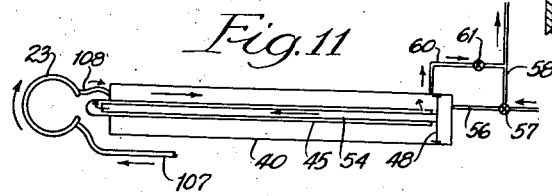
Inventor:
William Harvey Payne,
By [signature]
Attorneys Patented Feb. 28, 1939

2,148,834

UNITED STATES PATENT OFFICE 2,148,834

CLAMPING MECHANISM FOR ELECTRIC ARC FURNACE ELECTRODES

William Harvey Payne, La Grange, Ill.

Application March 13, 1937, Serial No. 130,742

18 Claims. (Cl. 13—16)

An electric arc furnace to which this invention applies is such as may be used for the melting and/or refining of metals, as for example steel, iron, and alloy metals, ferrous and non-ferrous. In such an electric furnace electric heat is applied by arcing to scrap and slag, the current being taken into the furnace through graphite or carbon electrodes, which in turn are clamp-supported to separate movable electrode arms, which in turn slide up and down columns or like members fastened to the side of the furnace shell or parts thereof.

In the operation of an electric arc melting furnace, the carbon or graphite electrodes gradually wear away at the bottom end in the furnace. This means that each electrode has to be "slipped" down in its clamp three or more times per day. Once or so a day a new section of electrode must be screwed to the one which has to be slipped almost down to the top of the electrode clamp on the arm. In order to avoid the necessity of performing these operations by hand and in close proximity to the extreme heat of the furnace, and to save valuable time, it is desirable to provide remotely controlled mechanisms which are adapted to clamp or release the electrode as occasion may require so as to provide for the proper feeding thereof.

It is also desirable to provide a cooling system for the mechanisms exposed to excessive heat and to make adequate provision for the conducting of the current to each of the electrodes through the clamping mechanism and the supporting elements therefor, and also to provide firm and rigid supporting means adjacent the furnace for raising and lowering the arms carrying the electrode clamps and the mechanism for operating the same.

The present invention is directed to the standards or supports provided for carrying the electrode arms and to a special method of construction which provides for the cooling of the same; to the form and arrangement of the carriage which rides upon the standards and serves as a mounting for the associated electrode arm; to the construction of the electrode arm and the means provided for cooling the same; to the construction of the electrode clamp and the means for operating and cooling the same; to the means provided for conducting the current through the clamp and to the electrode; and to the general construction and arrangement of the device as a whole and the constituent parts thereof.

In the drawings illustrating the invention,—

Figure 1 is a side elevation of an electric furnace illustrating the features of the present invention;

Fig. 2 is a top or plan view of the same;

Fig. 3 is a sectional elevation through one of the standards for the carriage which mounts one of the electrode arms;

Fig. 4 is an enlarged detail taken on line 4—4 of Fig. 2;

Fig. 5 is an end view taken on line 5—5 of Fig. 4;

Fig. 6 is a plan view of one of the electrode arms, with the carriage and clamp and the associated parts showing the clamp in its open or non-clamping position;

Fig. 7 is a similar view of the clamp, showing the clamp set to engage the electrode;

Fig. 8 is an enlarged sectional detail of the clamping collar taken on line 8—8 of Fig. 6;

Fig. 9 is a longitudinal sectional elevation of the clamp carrying arm and associated parts;

Fig. 10 is a detail of the safety dogs employed in connection with the elevating mechanism; and Fig. 11 is a diagrammatic view illustrating a normal direction of flow of the fluid through the mechanism.

As shown in Figure 1, the furnace 20 is of the usual type provided with a cover 21 through which project a group of three electrodes 22 arranged in triangular relation. Since the electrodes and the clamping and operating mechanisms for each are substantially identical, a description of one will suffice for all.

Referring to Fig. 6, each electrode is surrounded by a split ring shaped clamping collar 23, the ends of which are spaced on the inner side to afford a gap 24. Adjacent the opposed ends of the collar are located on one side a pair of outwardly projecting spaced lugs 25 and on the other side a single lug 26. The spaced lugs 25 have journalled therethrough a rock shaft 27 which mounts an arm 28 carrying a cross pin 29, the ends of which project through slots 30 in the respective lugs 25 and afford mountings for the open end of a U-shaped link or stirrup 31 which engages the lug 26 and is locked thereto by a strap plate 31ª, the arrangement being such that as the stirrup link is moved outwardly (upwardly in Fig. 6), the lugs on the opposite ends of the split clamping collar will be drawn toward one another, thus tending to close the gap and clamp the ring upon the electrode. A reverse movement can be imparted to the stirrup to assist in releasing the clamp in the event its resiliency is not sufficient to effect such release. The flexibility of the clamping ring is increased by cross notches 32, but the ring is made resilient so that as soon as the stirrup link is released the ring will be restored to its open position, although, as later described, auxiliary means are provided to open the clamp by power if necessary.

The clamping ring is provided on its interior with cores or channels 33 for the circulation of water or other cooling fluid, in conformity with a circulating system presently to be described. The clamping ring is embraced by a strap 34 of yoke formation of conductive material, preferably copper, and the clamping ring is provided on its outer side with a boss 35 which furnishes a mounting for the strap yoke 34, a clearance being elsewhere provided. The yoke is secured to the ring by bolts 36 or the like entered through the yoke and into the clamping ring, and the yoke is also provided with inwardly projecting spaced lugs 35a embracing and supporting the ring and its electrodes.

The yoke terminates in outwardly extending converging arms 37 which embrace the converging sides 38 of a casting 39 of conductive material, preferably copper, which is cored to receive the outer end of a tubular clamp supporting arm 40 which is preferably made of copper, the arrangement being such as to provide for the conducting of the current directly through the supporting members for the electrodes. The casting 39 is split on one side and the edges provided with flanges 41 which receive bolts 42, thus providing means for clamping the casting onto the end of the tubular arm 40, ribs 43 being provided for reinforcing purposes.

The rock shaft 27 is actuated by an arm 44 which in conjunction with the arm 28 affords a bell crank arrangement, and the inner end of the arm 44 is pivoted to a cored plunger rod 45 which extends longitudinally within the clamp carrying arm 40. The arm 40 at its inner end is closed by a threaded flanged cap 46 and at its outer end by a cap plate 47, and the arm as a whole constitutes a cylinder for the operation of a piston 48 which carries and operates the cored plunger rod 45. The outer end of the rod 45 slides through a dirt scraping bushing 45a which serves also to steady the inner end of the clamping collar, through the linkage mechanism, from side sway. The plunger rod operates within a tubular sleeve 49 the outer end of which is entered through the cap 46, a clearance being afforded between the plunger rod and the sleeve throughout their entire extent, with the exception at the outer bushing and the inner end, at which point a packing 50 is provided, which is adapted to be compressed against a circular shoulder 51 on the tubular sleeve 49 by the action of a gland 52 against which a flanged cap 53 operates.

The cored plunger rod 45 surrounds an inner tube 54, the inner end of which is entered into the piston 48 and is adapted to receive a restricted flow of fluid from behind the piston through an adjustable leak valve 55. Fluid, which is preferably cold water, is admitted behind the piston through a main supply pipe 56 entered through the cap plate 47 and under high pressure which will ordinarily be in the neighborhood of two hundred pounds to the square inch and under the control of a suitable two-way valve 57 represented diagrammatically in Fig. 11. When it is not desired to actuate the piston the valve will be turned to direct the fluid flow through a discharge pipe 58. The fluid under heavy compression admitted behind the piston will leak through in small quantities and at reduced pressure into the inner tube 54 and will pass out of the forward end of said tube and into the core of the tubular plunger rod, and will thence flow rearwardly and pass through an eduction port 59 into the space within the arm 40, which constitutes the cylinder for the piston 48. It will thence be educted through a discharge pipe 60 and back through the return pipe 58 under the control of a valve 61. A small proportion of water or other fluid cooling medium under high pressure thus serves as the means for applying pressure to the piston, and thereafter under reduced pressure as the cooling medium for the clamp carrying arm and associated parts.

In order to provide for the manual operation of the piston, in an emergency and on occasions where water pressure is not available, or where it is not desired to employ water, a push pin 62 is provided which is entered through a packed gland 63 in the cap plate 47, which push pin is acted upon by a pressure bar 64, one end of which engages a threaded stud 65 and is backed by a spring 66, the pressure of which may be adjusted by a nut 67. The other end of the pressure bar is mounted upon a threaded stem 68 which mounts an adjusting head 69 having an arm 70 and a handle 71 for rotating the head to force the proximate end of the pressure bar inwardly to apply a thrust to the push pin 62 which, being spring-backed at its opposite end, will exert a yielding pressure upon the center of the piston to compensate for expansion differences in working materials under widely varying heat conditions.

The clamp carrying arm 40 is provided with a through insulating collar 72, behind which is located a conductor terminal collar 73 of split clamping formation having flanges 74 which receive bolts 75 and nuts 76 for tightly clamping the conducting collar, which is preferably of copper, around the exterior of the arm 40 in order to afford a close conductive contact between the two. The collar 73 has the current wires 77 secured thereto. The insulating collar 72 affords insulation between the arm 40 and the carriage 78 which mounts the arm.

The carriage as a whole is formed of two identical sections, each having a body portion 79 of half cylindrical formation which fits snugly upon the insulating collar 72, so that the two sections in unison surround and embrace the collar. Each of the body portions is provided on each of its side margins with an outwardly projecting flange 80, which flanges register with one another and are secured by bolts or the like, which serve to clamp the parts together, giving to the whole the effect of a unitary structure.

Each of the sections 79 is provided with a medial longitudinally extending rib 81 of triangular formation, which at its longitudinal offset apex is provided with a transversely extending enlargement in the form of a drum-shaped journal mounting 82, which carries a pintle 83 having mounted thereon at each end a cone-shaped roller 84. It will be observed that the two halves of the carriage are arranged symmetrically with relation to one another (Fig. 4) and that the upper and lower mountings are out of vertical coincidence with one another and in position to bring each of the rollers 84 on the same side of the carriage to bear against the proximate side flange 85 of one of the channels 86, which in conjunction constitute the vertical standard 87 for the carriage 78.

The two channels forming the standard give to the standards an I-beam formation, but in order to provide for the circulation of water or other cooling fluid through the standard, the companion channels stand in separated relation (Fig. 3), which provides an inner chamber which is capped on its sides by flanged side plates 86a which embrace the edges of the channel flanges and stand in spaced relation to the channels to afford end chambers in communication with the center chamber provided between the webs of the channels, so that cooling fluid admitted through a pipe 86b and educted from a pipe 86c will circulate through all portions of the standard, and at the same time the arrangement is one which affords the necessary rigidity required in the structure.

The two rollers 84 on the same side of the carriage are supplemented each by a smaller roller 88 of tapered or conical formation, which is positioned to bear against the opposite flange of the channel 86. The rollers 88 are mounted upon pintles 89 carried by a sleeve 90 which is provided with arms 91 mounted at their lower ends upon pivots 92 projecting from the rib 81. Each sleeve 90 is provided with lugs 93 through which are entered threaded rods 94 carrying lock nuts 95, the opposite ends of the rods being entered through upstanding spaced plates 96. This arrangement enables the spacing of the companion rollers to be varied by the adjustment of the mountings for the smaller rollers, so that a proper contact with the flanges of the channels will be secured.

The three clamp carrying arms constituting a single group will be mounted for vertical movement between a set of four standards (Fig. 2), the two inner standards being composed of oppositely facing channels and the outermost standards only of inwardly facing channels. The channels thus afford trackways for the guiding and positioning of the mountings and for resisting the weight of the clamp carrying arms which overhang the center of the furnace. By having the carriage rollers on the inside flanges of the channels, the rollers and bearings and supporting steel cables are much better protected from flames.

The mountings for the arms are suspended from steel rope cables 97 (Fig. 10) which run over guide pulleys 98 mounted upon the tops of the standards and thence, as shown diagrammatically, around pulleys 99 which are arranged, according to standard practice, to compensate for tilting the furnace crucible, and thence around a winch motor 100, the free end of each cable being provided with a counter-weight 101. The inner ends of the cable lie between the plates 96 which terminate in laterally projecting arms 102, between which extend pintles 103 pivoting safety dogs 104. Each cable is directly connected to a finger 105 on the associated dog, which holds the tooth 106 of the dog away from the surface of the channel of the proximate standard, so that in normal operation the parts will move freely without setting the dogs in action. In the event of breakage, however, the preponderant weight of the finger 105 will cause the tooth of the dog to fly outwardly and engage the surface of the channel to operate as a safety brake and prevent the dropping of the apparatus.

The water or other fluid admitted under high pressure to the rear of the cylinder for the purpose of operating the plunger serves to cool the forward end of the tubular plunger rod and is admitted in small amount to the cylinder, but the principal volume of cooling medium is admitted directly to the clamping ring through a supply pipe 107, and after circulation through the clamping ring the water is educted through a flexible pipe 108 leading from the opposite end of the clamping ring into the interior of the cylinder at its forward end, so that the principal cooling effect will be due to the inflow of the cooling medium at this point.

The water or other cooling fluid is admitted to the clamping ring at relatively low pressure, as for instance fifty pounds, but it will discharge readily into the cylinder chamber of the carrying arm 40 by reason of the fact that the fluid therein contained is under low pressure and of relatively small volume as a result of the reduction in pressure effected by its discharge through the leak valve.

The water or other cooling fluid admitted from both of these sources will be educted through the same return pipe, and the low pressure water entering through the pipe 108 will also act as the pressure medium for operating the piston in the rearward direction in a manner to be presently described.

*Operation*

In operation, after the electrodes have been initially adjusted to the desired positions, the clamps will be set by the admission of cooling fluid under high pressure to the rear end of each of the supporting arm cylinders composing the group. The application of the pressure against each of the pistons will have the effect of thrusting the respective plunger rods forwardly, which in each instance will rock the shaft 27 which exerts a pull on the associated stirrup and a reaction which causes the opposite end of the split clamping ring to draw inwardly toward the associated rock shaft 27.

Although the free end of the plunger rod tends to move slightly in an arcuate direction, this arcuate tendency is compensated by the drawing together of the free ends of the split clamping ring, so that the rock shaft 27 will tend to move inwardly to an extent which counteracts this arcuate movement, and the resulting movement of the plunger rod will be substantially rectilinear, which is desirable in order to prevent any tendency toward tilting or canting of the piston.

The drawing together of the clamping ring will clamp the electrode in the desired position, but when it becomes necessary to readjust the electrode to compensate for the fusing of its lower end, the pressure on the piston will be released and the clamping ring will spring outwardly slightly, to its open position, thereby permitting the electrode to slip to the degree required to correctly reposition it. If when the clamp pressure is released the clamping collar does not spring open, the closing of the discharge valve 61 will instantly build up approximately a fifty pound pressure, which will force the piston 48 to return and thus open the clamping collar by power.

So long as the clamps are set, the circulatiton of water or other cooling medium will be maintained through the supporting arm 40 by reason of the leakage under pressure of the cooling medium, which will be circulated through the arm and associated parts in the manner heretofore described, and the circulation of the cooling medium through the clamps and standards may be maintained at all times irrespective of the admission of fluid to the rear of the piston.

The flow of the cooling medium is so directed that the forward end of the tubular plunger rod will be initially subjected to the cooling influence of the medium while in its coldest condition, which is desirable, since this portion of the plunger rod is subjected to the highest temperature, but the cooling medium will circulate throughout the entire length of the clamp carrying arm so that all portions thereof will be cooled, the cooling medium from the clamp itself being admitted at the forward or hottest end of the arm and combining with the cooling medium admitted by leakage from behind the piston prior to the discharge of cooling fluid by the return connection of the rear end of the arm.

It is desirable that the cooling fluid admitted under high pressure at the outer end of the carrying arm cylinder for operating the piston be delivered from a motor operated accumulator in the transformer room, or otherwise protected, and having a high pressure water supply for one hour or more to take care of emergency electrical outages, so that abundant pressure will be available for operating and for cooling purposes at all times.

The provision made for the cooling of the standards is important, since they are subjected to a high degree of heat, and by providing for the cooling of the apparatus as set forth, unequal expansion and contraction is taken care of in a practical way which might otherwise seriously interfere with the proper functioning of the furnace.

The hand operating mechanism is located at the extreme rear of the apparatus and at the point most distantly removed from heat and flame, for ease of use when needed. Even when under clamping pressure the power means as herein described may "give", that is, move slightly in or out against its accumulator supply, and thus, with approximately constant pressure applied to clamp the electrode, the system will also allow for difference in expansion and contraction of the materials involved. The hand operating clamping mechanism as described herein also works against a spring to provide a yielding pressure, when it is used, for the same reason.

The formation of the conducting supporting arm and its connection with the yoke which surrounds the clamp not only affords abundant conduction for the current but also provides effective water cooled mechanical support for the associated mechanisms, and at the same time the arrangement is one which may be easily and quickly disassembled, as occasion requires, by merely loosening and removing the split casting 39 from the end of the supporting arm, which permits the head cap 46 to be unscrewed, thereby obtaining access to the interior. The piston end also is accessible in similar manner.

The construction of the standards is also one which provides for the admission of a cooling fluid from any suitable source, and this is highly desirable, since the standards are located in close proximity to the furnace and are subjected to a high degree of temperature which, unless counteracted, might tend to warping and buckling, which would interfere with the proper performance of their functions in guiding and supporting the carriages for the clamp carrying arms.

The arrangement of the rollers is one which brings the upper and lower large rollers of each carriage into contact with the proximate flanges of the channels, so that any forward tipping of the clamp carrying arms will be counteracted, and ordinarily the small rollers will be so adjusted as to slightly clear the channels, although on occasion they will exert a steadying or guiding influence in the event the ends of the arms are lifted in a manner which would otherwise produce a tilting or canting effect unless counteracted by the smaller rollers.

The construction of the device as a whole is one which affords a large volume of cored copper to minimize skin effect losses when conducting a high alternating current flow into the electrodes.

The symmetrical arrangement of the sections of the carriage for the clamp carrying arm enables these parts to be used interchangeably with one another, and the construction throughout is one which provides a strong, rigid and easily erected apparatus for the intended purpose.

Although the invention has been described with particularity as to all of its details, it is not the intention, unless otherwise indicated in the claims, to limit the invention to the form shown, since numerous modifications may be made in structural details without departing from the spirit of the invention.

I claim:

1. In clamping mechanism for electric arc furnace electrodes, the combination of a clamping collar split on its inner side and adapted to engage an electrode, a rigid yoke shaped strap of conductive material embracing and fixedly supporting the split clamping collar and having conductive contact therewith and adapted to sustain the weight of the electrode, a supporting arm to which the inwardly extending arms of the yoke shaped strap are secured, means passing through the supporting arm and enclosed thereby for contracting and releasing the inner split side of the clamping collar, with means for raising and lowering the supporting arm and means for cooling the supporting arm and parts associated therewith.

2. In clamping mechanism for electric arc furnace electrodes, the combination of a split clamping collar adapted to engage an electrode, a rigid yoke shaped strap of conductive material embracing and fixedly supporting the split clamping collar and having conductive contact therewith and adapted to sustain the weight of the electrode and secured thereto only at its outer medial region and elsewhere affording clearance for the movements of the clamping collar, a supporting arm to which the inwardly extending arms of the yoke shaped strap are rigidly secured, means passing through the supporting arm and enclosed thereby for contracting and releasing the inner split side of the clamping collar, with means for raising and lowering the supporting arm.

3. In clamping mechanism for electric arc furnace electrodes, the combination of a clamping collar split on its inner side and adapted to engage an electrode, a rigid yoke shaped strap of conductive material embracing and supporting the split clamping collar and having conductive contact therewith and adapted to sustain the weight of the electrode, a supporting arm of closed tubular formation to which the inwardly extending arms of the yoke shaped strap are rigidly secured, means passing through the supporting arm and enclosed thereby for contracting and releasing the clamping collar, means for circulating a cooling fluid through the tubular supporting arm with means for raising and lowering the supporting arm.

4. In clamping mechanism for electric arc furnace electrodes, the combination of a split clamping collar adapted to engage an electrode, a yoke shaped strap of conductive material embracing and supporting the split clamping collar and having conductive contact therewith and adapted to sustain the weight of the electrode and secured thereto only at its outer medial region and elsewhere affording clearance for the movements of the clamping collar, a supporting arm to which the inwardly extending arms of the yoke shaped strap are rigidly secured, means passing through the supporting arm and enclosed thereby for contracting and releasing the inwardly presented side of the clamping collar, with means for raising and lowering the supporting arm.

5. In clamping mechanism for electric arc furnace electrodes, the combination of a clamping collar split on its inner side and adapted to engage an electrode, a rigid yoke shaped strap of conductive material embracing and supporting the split clamping collar and having conductive contact therewith and adapted to sustain the weight of the electrode, a supporting arm to which the inwardly extending arms of the yoke shaped strap are rigidly secured, means passing through the supporting arm and enclosed thereby for contracting and releasing the inwardly presented split side of the clamping collar, with means for raising and lowering the supporting arm, said supporting arm being of conductive material and being conductively connected with the yoke shaped strap.

6. In clamping mechanism for electric arc furnace electrodes, the combination of a split ring shaped clamp adapted to engage an electrode, a tubular supporting arm and means connecting the arm with the split ring shaped clamp, means for drawing together and releasing the split ring shaped clamp, a tubular plunger for actuating said clamp operating means extending longitudinally within the tubular supporting arm, a piston within the tubular supporting arm and secured to said plunger, a closing cap at each end of the tubular supporting arm constituting a cylinder in conjunction therewith, a tube extending longitudinally of said cylinder and surrounding the tubular plunger, the plunger having sliding relation thereto, an inner tube within the plunger and movable therewith, means for admitting cooling fluid under reduced pressure to the inner tube for circulation therethrough and thence through the interior of the plunger, the plunger being provided with an aperture for venting said pressure to the interior of the cylinder, and means for admitting cooling fluid under pressure behind the piston and for educting fluid from the exterior of the cylinder.

7. In clamping mechanism for electric arc furnace electrodes, the combination of a split ring shaped clamp adapted to engage an electrode, a tubular supporting arm and means connecting the arm with the split ring shaped clamp, means for drawing together and releasing the split ring shaped clamp, a tubular plunger for actuating said clamp operating means extending longitudinally within the tubular supporting arm, a piston within the tubular supporting arm and secured to said plunger, a closing cap at each end of the tubular supporting arm constituting a cylinder in conjunction therewith, a tube extending longitudinally of said cylinder and surrounding the tubular plunger, the plunger having sliding relation thereto, an inner tube within the plunger and movable therewith, means for admitting cooling fluid under reduced pressure to the inner tube for circulation therethrough and thence through the interior of the plunger, the plunger being provided with an aperture for venting said pressure to the interior of the cylinder, means for admitting cooling fluid under pressure behind the piston and for educting fluid from the exterior of the cylinder, a push pin entered through the rear end of the cylinder and adapted to exert pressure on the piston, and manually operated means for actuating the push pin to operate the piston.

8. In clamping mechanism for electric arc furnace electrodes, the combination of a split ring shaped clamp adapted to engage an electrode, a tubular supporting arm and means connecting the arm with the split ring shaped clamp, means for drawing together and releasing the split ring shaped clamp, a tubular plunger for actuating said clamp operating means extending longitudinally within the tubular supporting arm, a piston within the tubular supporting arm and secured to said plunger, a closing cap at each end of the tubular supporting arm constituting a cylinder in conjunction therewith, a tube extending longitudinally of said cylinder and surrounding the tubular plunger, the plunger having sliding relation thereto, an inner tube within the plunger and movable therewith, means for admitting cooling fluid under reduced pressure to the inner tube for circulation therethrough and thence through the interior of the plunger, the plunger being provided with an aperture for venting said pressure to the interior of the cylinder, means for admitting cooling fluid under pressure behind the piston and for educting fluid from the exterior of the cylinder, means for admitting cooling fluid to the interior of the split ring shaped clamp, and means for educting cooling fluid therefrom and discharging it into the supporting arm cylinder for cooling the same.

9. In clamping mechanism for electric arc furnace electrodes, the combination of a clamp adapted to engage an electrode, means for actuating said clamp, a tubular plunger engaging said actuating means, a tubular supporting arm upon which said clamp is mounted, said arm being capped at its ends to constitute a cylinder, the tubular plunger being entered within said cylinder and carrying a piston operating within said cylinder, a tube within the cylinder surrounding said plunger, the plunger having sliding relation thereto, an inner tube within the tubular plunger and in spaced relation thereto, means for admitting cooling medium under reduced pressure to the inner tube for circulation therefrom through the plunger, the plunger being provided with an aperture for venting said fluid to the interior of the cylinder, and means for educting fluid from the cylinder.

10. In clamping mechanism for electric arc furnace electrodes, the combination of a clamp adapted to engage an electrode, means for actuating said clamp, a tubular plunger engaging said actuating means, a tubular supporting arm upon which said clamp is mounted, said arm being capped at its ends to constitute a cylinder, the tubular plunger being entered within said cylinder and carrying a piston operating within said cylinder, a tube within the cylinder surrounding said plunger, the plunger having sliding relation thereto, an inner tube within the tubular plunger and in spaced relation thereto, means for admitting cooling medium under reduced pressure to the inner tube for circulation therefrom through the plunger, the plunger being provided with an aperture for venting said fluid to the interior of the cylinder, and means for educting fluid from the cylinder, the clamp being cored on its interior and having means for admitting a cooling fluid thereinto, and means for educting cooling fluid from the clamp and discharging the same into the cylinder for eduction therefrom.

11. In clamping mechanism for electric arc furnace electrodes, the combination of a clamp adapted to engage an electrode, means for actuating said clamp, a tubular plunger engaging said actuating means, a tubular supporting arm upon which said clamp is mounted, said arm being closed at its ends to constitute a cylinder, the tubular plunger being entered within said cylinder and carrying a piston operating within said cylinder, means for admitting a fluid cooling medium behind said piston for operating the same, means affording communication for the circulation of cooling medium from behind the piston to the interior of the tubular plunger and thence from the plunger to the cylinder, and means for educting the fluid from the cylinder.

12. In clamping mechanism for electric arc furnace electrodes, the combination of a clamp adapted to engage an electrode, means for actuating said clamp, a plunger engaging said actuating means, a tubular supporting arm upon which said clamp is mounted, said arm being closed at its ends to constitute a cylinder, the plunger being entered within said cylinder and carrying a piston operating within the cylinder, means for admitting a fluid medium under pressure behind said piston for operating the same, means for circulating a cooling medium under pressure through the clamp and for educting said medium therefrom and into the interior of the cylinder in position to act upon the forward side of said piston, means for educting cooling fluid from the cylinder in advance of the piston, and valve means for closing the eduction of said fluid to build up a pressure within the cylinder to operate the same in the reverse direction.

13. In clamping mechanism for electric arc furnace electrodes, the combination of a clamp adapted to engage an electrode, means for actuating said clamp, a tubular plunger engaging said actuating means, a tubular supporting arm upon which said clamp is mounted, said arm being closed at its ends to constitute a cylinder, the tubular plunger being entered within said cylinder and carrying a piston operating within said cylinder, means for admitting a fluid cooling medium behind said piston for operating the same, means affording communication for the circulation of cooling medium from behind the piston to the interior of the tubular plunger and thence from the plunger to the cylinder, means for educting the fluid from the cylinder, and means for circulating a cooling medium through the clamp and for educting said medium therefrom and to the interior of the cylinder.

14. In clamping mechanism for electric arc furnace electrodes, the combination of a clamp adapted to engage the electrode, means for actuating said clamp, a plunger engaging said actuating means, a support for said clamp including a cored member, a tubular supporting arm entered into said cored member, said arm being closed at its ends to constitute a cylinder, the plunger being entered within said cylinder and carrying a piston operating within said cylinder, means for admitting a fluid medium against said piston for operating the same, and means providing for the circulation of a cooling medium through the interior of the cylinder.

15. In clamping mechanism for electric arc furnace electrodes, the combination of a clamp adapted to engage an electrode, means for actuating said clamp, a plunger engaging said actuating means, a tubular supporting arm upon which said clamp is mounted, said arm being closed at its ends to constitute a cylinder, the plunger being entered within said cylinder and carrying a piston operating within the cylinder, means for admitting a fluid medium under pressure against said piston for operating the same, and means for circulating a cooling medium through the clamp and for educting said medium therefrom and circulating the same through the interior of the cylinder.

16. In clamping mechanism for electric arc furnace electrodes, the combination of a clamp adapted to engage an electrode, means for actuating said clamp, a plunger engaging said actuating means, a tubular supporting arm upon which said clamp is mounted, said arm being constructed to provide a cylinder, the plunger being entered within said cylinder and carrying a piston operating within the cylinder, means for admitting a fluid medium under pressure against said piston for operating the same, and means for circulating a cooling medium through the clamp and for educting said medium therefrom and circulating the same through the interior of the cylinder.

17. The combination of a clamping collar split on its inner side and adapted to engage an electrode, means for supporting the clamping collar, said means including a cored casting, a tubular arm entered into said cored casting, said arm constituting a cylinder, a plunger terminating in a piston and mounted for straight-line movement within said cylinder, and arcuately movable connections between the end of the plunger and the free ends of the clamping collar so disposed as to draw together the free ends of the collar in a degree requisite to effect clamping movements and also compensate the arcuate movements of the connections to the extent necessary to accommodate the straight-line movements of the plunger.

18. In mechanism of the class described, the combination of a split clamping collar adapted to engage an electrode, means for supporting the clamping collar, means for actuating the clamping collar to grip or release the electrode, said actuating means including a cylinder, means mounting said collar at a point between the ends thereof on said cylinder, a plunger terminating in a piston and mounted for straight line movement within said cylinder and toward the relatively movable free end portion of said collar, and arcuately movable connections between the end of the plunger and the free ends of the split clamping collar so disposed as to draw together the free ends of the collar in a degree requisite to effect clamping movements and compensate for the arcuate movements of the connections to the extent necessary to accommodate the straight line movements of the plunger.

WILLIAM HARVEY PAYNE.